April 11, 1944.　　F. B. EDGAR　　2,346,565
POWER CONTROL
Filed March 19, 1941　　2 Sheets-Sheet 1

INVENTOR.
F. B. Edgar
BY M. Talbert Dick

April 11, 1944.  F. B. EDGAR  2,346,565
POWER CONTROL
Filed March 19, 1941  2 Sheets-Sheet 2

INVENTOR.
F. B. EDGAR
BY M. Talbert Dick

Patented Apr. 11, 1944

2,346,565

UNITED STATES PATENT OFFICE 2,346,565

POWER CONTROL

Frank B. Edgar, Des Moines, Iowa

Application March 19, 1941, Serial No. 384,109

3 Claims. (Cl. 192—18)

This invention relates to controls for shafts. More specifically, it relates to controls for rotating shafts.

Recently a number of labor saving devices have been developed for use on the front ends of tractors and the like. These include such items as dirt lifters, manure loaders, and hay stackers. The construction of these devices is such that a large shovel member or other suitable device mounted on the front of the tractor and powered from a suitably located power take-off is capable of being caused to scoop into a pile of dirt or the like on the ground upon the tractor being driven forward. The shovel is then raised into a supported position in front of the tractor by means of power supplied from the power take-off. With the scoop in the elevated position, it is possible to drive the tractor to another location some distance away and there make disposition of the load.

The custom has been in the past to provide a clutch mechanism for operating the driving means which raises the scope in these devices and to supply an individual separate braking means or other suitable construction for maintaining the scoop in an elevated position after it has been loaded and raised. These structures have involved duplication of parts and substantial complexity in construction and operation.

It is an object of this invention to provide a device which is capable of both communicating rotation and halting rotation.

Another object of this invention is to provide such a device in which both results may be secured by operation of a single lever.

A still further object of this invention is to provide a clutch-brake device in which both the brake and the clutch actively engage the same shaft.

Yet another object of this invention is to provide a clutch-brake mechanism in which the brake as well as the clutch is of the multiple disc type of construction.

In order that a more clear and concise understanding of my invention may be had, reference should be made to the accompanying drawings forming a part of this specification, in which.

Figure 4:
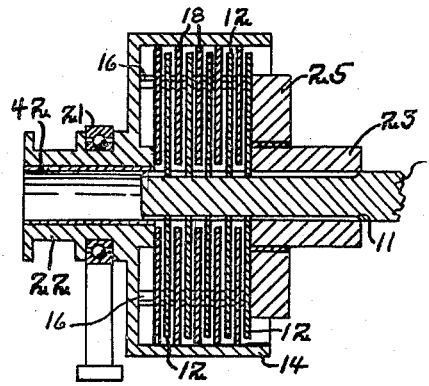
Fig. 4 is a vertical cross sectional view of the clutch portion of my device taken on a plane parallel with the direction of the splined shaft.
Figure 5:
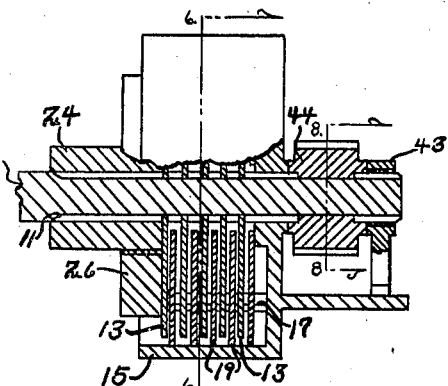
Fig. 5 is a similar view of the braking portion of my structure, a part of the top portion of the brake drum and slidable washer-like member being shown in side elevation.
Figure 6:
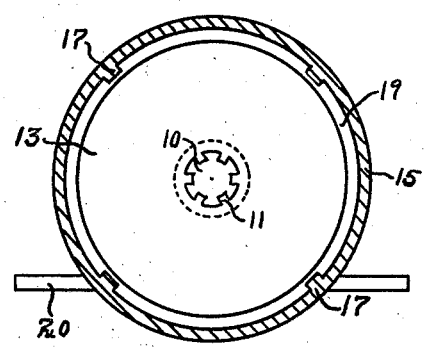
Fig. 6 is a vertical cross sectional view taken on line 6—6 of Fig. 5.
Figure 7:
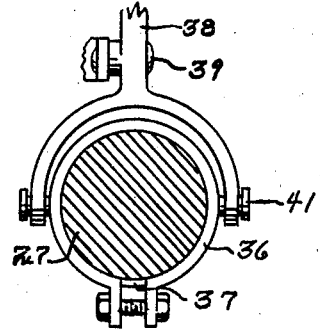
Fig. 7 is a vertical cross sectional view taken on line 7—7 of Fig. 1.
Figure 8:
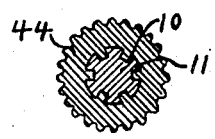
Fig. 8 is a vertical cross sectional view taken on line 8—8 of Fig. 5.

Referring more specifically to the drawings, I have used the reference numeral 10 to designate the central shaft. Splines on each end of said shaft are designated by 11. Discs 12 suitably notched on their central bearings are received on one end of the splined shaft 10. Discs 13 similarly notched are received on the other end of the splined shaft 10. Clutch housing 14 and brake housing or drum 15 are provided for the said discs 12 and 13 respectively. Ridges 16 are provided on the inner periphery of the housing 14 and ridges 17 are provided on the inner periphery of the housing or drum 15. Discs 18 suitably notched for engagement with the ridges 16 are mounted in the housing 14. It is apparent from Fig. 4 that the discs 18 have central openings of a size greater than the diameter of the splined shaft 10 so that they do not directly engage the said shaft 10. Similarly discs 19 suitably notched for engagement with the ridges 17 on the inner periphery of the drum 15 are mounted in the said drum or housing 15. The central openings of the discs 19 are also of a size such that they do not directly engage the splined shaft. As is apparent from Fig. 4, the discs 18 keyed to the clutch housing 14 and the discs 12 keyed to the adjacent end of the splined shaft 10 alternate in occurrence. The same is true of the discs 13 and 19 keyed to the other end of the splined shaft 19 and to the brake drum respectively. The construction is such that all of the discs 12, 13, 18 and 19, or at least all of them except the end-most discs 18 and 19, are easily slidable along the ridges or splines which they respectively engage. The brake drum or housing 15 is stationarily mounted upon any suitable support 20. The clutch housing 14 is rotatably mounted upon a bearing structure 21. The outer end of said housing 14 is provided with a pulley 22 or other suitable means for transmitting power. Slidably splined on the shaft 10 adjacent the inner-most discs 12 and 13 are the collar members 23 and 24 respectively. Slidably mounted on the collar 23 is a shorter collar or washer-like member 25 stationed adjacent the inner-most disc 12. A similar washer-like member 26 is slidably mounted on the collar 24 adjacent the innermost disc member 13. As appears clearly in Fig. 1, the central portion of the shaft 10 is comprised of an enlarged section 27 and two oppositely facing cone members 28 and 29. Bands 30 and 31 encircle collars 23 and 24 respectively and are clamped thereto by the bolts 32 and 33. Finger-like cam members 34 are pivoted on brackets 35 secured to the respective bands 30 and 31. A part of the enlarged central portion 27 of the shaft 10 is rotatably received in a flanged band 36, which engages a ridge 37 (see Fig 7), on said enlarged central portion 27. Obviously while the shaft 10 is entirely free to rotate within the said band 36, said band 36 is prevented, by the engagement of its flanges on the ridge 37, from being slidable longitudinally of the shaft 10. The lever 38 is pivotally mounted at 39 on the bracket 40. The lower end of the lever 38 engages the band 36 in a rotatable connection at 41. At the clutch end of my device, the shaft 10 is longitudinally slidable as well as rotatably mounted in the journal 42 of the general housing structure 14. At the brake end of my device, the end of the shaft 10 is rotatably and longitudinally slidably supported in the bearing 43. Between the bearing 43 and the drum 15, the gear 44 is mounted on the shaft 10. The said gear 44 is longitudinally slidable on the shaft 10, but its central bearing hole is so notched as to engage the splines on the shaft 10, whereby it is rotatably keyed to the said shaft 10. (Fig. 10.)

Figure 1:
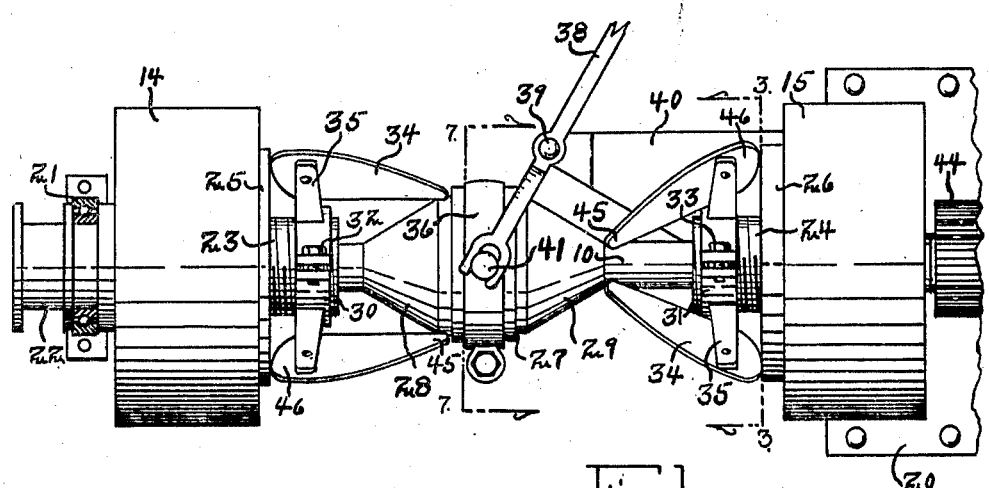
Fig. 1 is a side elevation of my structure substantially complete.
Figure 2:
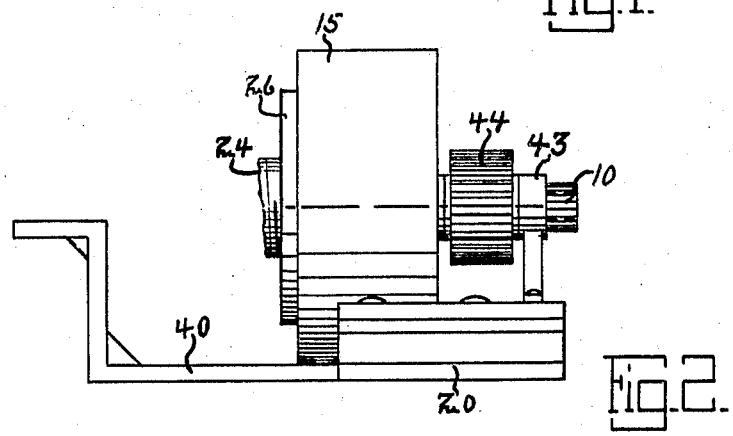
Fig. 2 is a bottom view of the brake drum and certain connected parts used in my structure and shown at the right hand side in Fig. 1.
Figure 3:
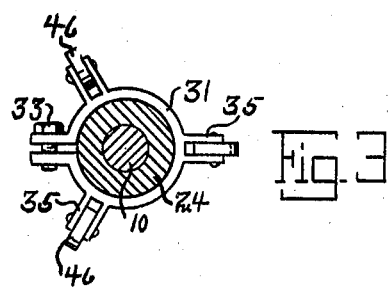
Fig. 3 is a vertical cross sectional view taken on line 3—3 of Fig. 1.

Referring now to the operation of my device, power is transmitted from the power take-off of the tractor to the pulley 22, whereby the clutch housing 14 and hence the discs 18 are caused to rotate. When it is desired to drive the shaft 10, the lever 38 is manually moved into the position shown in Fig. 1. Movement of the lever into this position obviously moves the shaft 10, including the enlarged section 27 and the cone 28, toward the clutch end of my device. By this action, the end portions 45 of the long ends of the cam fingers 34 are caused to travel up the inclined plane of the cone 28 until they are in substantially the positions shown in Fig. 1, namely resting on a flat surface of the enlarged section 27. As the ends 45 of the cam fingers 34 are moved outwardly from a point adjacent the slender sections of the shaft 10 to a point adjacent the enlarged section 27, the cam ends 46 of said cam fingers 34 are caused to move inwardly toward the shaft 10 and hence to force the washer-like member 25 intimately against the innermost disc 12, which in turn presses against the innermost disc 18 and so on. The movement of the member 23 away from the member 14 is prevented by the termination of the splines on the shaft 10. Obviously, at least by the time that all of the plates 12 have been forced into intimate contact with all of the plates 18, which effect has been accomplished by the time the ends 45 have reached the base of the cone 28, the shaft 10 will be rotating with the housing 14 due to the rotatable motion transmitted thereto by the discs 18 through the discs 12. When the clutch is operating as it is when the lever 38 is in the position shown in Fig. 1, the brake portion of my device is out of engagement. When it is desired to halt the rotation of the shaft 10 or to hold said shaft in a non-rotatable position, the lever 38 is moved into a position substantially on the other side of the vertical from that in which it is shown in Fig. 1. This action has an effect on those cam fingers 34 which are on the brake side of my device similar to that which movement of the lever 38 into the position shown in Fig. 1 has on the cam fingers 34 on the clutch side. That is, it causes their ends 45 to climb the incline of the cone 29 whereby their cam ends 46 are caused to force inwardly the washer-like member 26 and hence to eventually bring all of the discs 13 into engagement with the stationary discs 19. When the latter condition has been reached, obviously the shaft 10 is held against rotation. When the lever 38 is in a substantially vertical position, my device is in neutral and neither the braking mechanism nor the clutch mechanism is in engagement. In both the engagement of the clutch operation and the application of the brake operation, the incline of the respective cones 28 and 29 and the substantial leverage furnished by the long ends of the cam fingers 34 cooperate to reduce the manual power necessary in manipulating the lever 38. When the shaft 10 is being driven by the clutch mechanism, power from said shaft 10 may be transmitted by means of the gear 44, which is keyed to said shaft 10.

While I have mentioned my device as having specific application in connection with loaders and the like for the front ends of tractors, its scope of utility is obviously by no means limited thereto. For example my structure might very well be used in the power transmission structure of a steamship.

I have described a specific embodiment of my invention for the purposes of illustration and clarity; obviously numerous modifications in addition to those specifically herein mentioned may be made without departing from the spirit and scope of my invention. Therefore, I wish to be limited herein only by the prior art and appended claims.

I claim:

1. A power control device comprising, a rotatable, longitudinally, slidable shaft, a multiple disc type clutch for rotating said shaft, a brake for said shaft including a plurality of discs keyed to said shaft capable of engaging a plurality of stationary discs, a surface on said shaft inclined away from the brake and toward the clutch, a surface on said shaft inclined away from the clutch and toward the brake, a cam structure capable of being operated at least in part by one of said inclined surfaces to cause engagement of the clutch, a cam structure capable of being operated at least in part by the other of said inclined surfaces to cause engagement of the brake, and means for sliding said shaft longitudinally in one direction to cause operative engagement of the clutch operating cam structure with one inclined surface and in the other direction to cause operative engagement of the brake operating cam structure with the other inclined surface.

2. A power control device comprising a rotatable longitudinally slidable shaft, a multiple disc type clutch for rotating said shaft, a brake for said shaft, a surface on said shaft inclined away from the brake and toward the clutch, a surface on said shaft inclined away from the clutch and toward the brake, a cam structure capable of being operated at least in part by one of said inclined surfaces to cause engagement of the clutch, a cam structure capable of being operated at least in part by the other of said inclined surfaces to cause application of the brake, and means for sliding said shaft longitudinally in one direction to cause operative engagement of the clutch operating cam structure with one inclined surface and in the other direction to cause operative engagement of the brake operating cam structure with the other inclined surface.

3. A power control device comprising a rotatable longitudinally slidable shaft, a multiple disc type clutch for rotating said shaft, a brake for said shaft, a surface on said shaft inclined away from the brake and toward the clutch, a surface on said shaft inclined away from the clutch and toward the brake, a structure capable of being operated at least in part by one of said inclined surfaces to cause engagement of the clutch, a structure capable of being operated at least in part by the other of said inclined surfaces to cause application of the brake, and means for sliding said shaft longitudinally in one direction to cause operative engagement of the clutch operating structure with one inclined surface and in the other direction to cause operative engagement of the brake operating structure with the other inclined surface.

FRANK B. EDGAR.